United States Patent
Lindsay et al.

(10) Patent No.: US 7,539,667 B2
(45) Date of Patent: May 26, 2009

(54) METHOD, SYSTEM AND PROGRAM FOR EXECUTING A QUERY HAVING A UNION OPERATOR

(75) Inventors: Bruce Gilbert Lindsay, San Jose, CA (US); Linqi Liu, Toronto (CA); Robert Paul Neugebauer, Stouffville (CA); Mir Hamid Pirahesh, San Jose, CA (US); David C. Sharpe, Oakville (CA); Nattavut Sutyanyong, Thornhill (CA); Calisto Paul Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 10/982,441

(22) Filed: Nov. 5, 2004

(65) Prior Publication Data

US 2006/0101011 A1     May 11, 2006

(51) Int. Cl.
*G06F 17/30*     (2006.01)
(52) U.S. Cl. .............................. 707/3; 707/2
(58) Field of Classification Search ............ 707/2–5
See application file for complete search history.

(56) References Cited

U.S. PATENT DOCUMENTS

| | | | | |
|---|---|---|---|---|
| 5,600,829 | A * | 2/1997 | Tsatalos et al. | 707/2 |
| 6,032,143 | A | 2/2000 | Leung et al. | |
| 6,067,542 | A | 5/2000 | Carino, Jr. | |
| 6,341,277 | B1 * | 1/2002 | Coden et al. | 707/2 |

(Continued)

FOREIGN PATENT DOCUMENTS

WO    WO 02/061622 A2    8/2002

OTHER PUBLICATIONS

Lu et al., "Multidatabase Query Optimization: Issues and Solutions", Research Issues in Data Engineering, [online], Apr. 20, 19933, P-137-143, [retrieved on Jan. 12, 2009]. Retrieved from Internet: <URL: http://ieeexplore.ieee.org/stamp/stamp.jsp?arnumber=281932&isnumber=6981>.*

(Continued)

*Primary Examiner*—John E Breene
*Assistant Examiner*—Dennis Myint
(74) *Attorney, Agent, or Firm*—Sughrue Mion, PLLC

(57) ABSTRACT

Disclosed is a data processing system implemented method, a data processing system and an article of manufacture for executing a query having a union operator. A data processing system implemented method direct the data processing system to execute a query against a database having data objects. The query has sub-queries and having a union operator. The union operator is operable on sub-queries associated with the query. The database is operatively coupled to the data processing system. The data processing system implemented method including grouping the sub-queries of the union operator according to identified structural similarities, the identified structural similarities being based on an analysis of the sub-queries, grouping the data objects of the database according to the grouped sub-queries, replacing the grouped data objects and any sub-queries associated with the grouped data objects with a reference to a representative data object and a representative sub-query, and accessing at least one member of the grouped data objects, the accessing of the at least one member of the grouped data object being based on the reference.

3 Claims, 6 Drawing Sheets

U.S. PATENT DOCUMENTS

| | | | |
|---|---|---|---|
| 6,356,887 | B1 | 3/2002 | Berenson et al. |
| 6,581,055 | B1* | 6/2003 | Ziauddin et al. .............. 707/4 |
| 6,775,681 | B1* | 8/2004 | Ballamkonda et al. ...... 707/102 |
| 7,120,623 | B2* | 10/2006 | Ganesan et al. ................ 707/2 |
| 2004/0006574 | A1* | 1/2004 | Witkowski et al. ....... 707/104.1 |
| 2004/0220923 | A1* | 11/2004 | Nica ............................. 707/3 |
| 2005/0044102 | A1* | 2/2005 | Gupta et al. ................ 707/102 |
| 2005/0262067 | A1* | 11/2005 | Lee et al. ....................... 707/3 |
| 2006/0026147 | A1* | 2/2006 | Cone et al. ..................... 707/3 |
| 2006/0047622 | A1* | 3/2006 | Folkert et al. .................. 707/1 |
| 2006/0064407 | A1* | 3/2006 | Santosuosso .................. 707/3 |

OTHER PUBLICATIONS

Katchaounov et al., "Scalable View Expansion in a Peer Mediator System", Proceedings of the Eigth International Conference on Database Systems for Advanced Applications (DASFAA, 03), Mar. 26, 2003, [retrieved on Jan. 12, 2009]. Retrieved from Internet: <URL: http://ieeexplore.ieee.org/stamp/stamp.jsp?arnumber=1192374 &isnumber=26738>.*

Ning An et al.: "Toward an Accurate Analysis of Range Queries on Spatial Data," IEEE Transactions on Knowledge and Data Engineering, vol. 15, No. 2, Mar./Apr. 2003.

Disclosed anonymously: "Improving the Performance of Correlated Subqueries in SQL,", Research Disclosure No. 310117, Kenneth Mason Publications Ltd., England, ISSN 0374-4353, Feb. 17, 1990.

Jin Deog Kim et al.: "Estimation Methods of Selectivity for Spatial Query Optimization," Journal of KISS(B): Software and Applications, ISSN 1226-2285, vol. 25, No. 7, Jul. 1998.

Cesar A. Galindo-Legaria et al.: "Orthogonal Optimization of Subqueries and Aggregation," ACM SIGMOD, May 21-24, 2001, Santa Barbar, CA, USA.

* cited by examiner

METHOD, SYSTEM AND PROGRAM FOR EXECUTING A QUERY HAVING A UNION OPERATOR

FIELD OF THE INVENTION

The present invention relates to database management systems in general, and more specifically, the present invention relates to a data processing system, a data processing system implemented method and an article of manufacture for executing a query having a UNION operator.

BACKGROUND

Database management systems (DBMSs) are used to organize and manage large amounts of information. The data stored in databases is normally structured into records with predetermined fields. These fields identify the information in the records, and are normally organized into tables having rows and columns such that a query may be executed by a DBMS and the DBMS may generate a query response having query-satisfying information retrieved from the row(s) and column(s) associated with the tables.

A DBMS is an executable program stored on a data processing system. As is known to those skilled in the art, such a data processing system may include different hardware and software combinations. Users may access tabled information stored within a database which is operatively coupled to the DBMS by way of a user interface using, for example, a structured query language (SQL) or an XQuery and the like.

A given query may be parsed and compiled by a compiler contained within the DBMS, and as a result of compiling the given query the DBMS generates executable code which may be used for retrieving query-satisfying data which may satisfy the requirements of the given query. Typically, the DBMS may include a user command processor for processing user commands, such as queries, and executing such user commands against the database. Data processing system usable medium may contain executable code for directing the DBMS to perform algorithms related to operations of the DBMS. The data processing system usable medium may also store the database.

One way to manipulate and access a data collection stored within the database is to use a query, such as an SQL query. SQL queries may be of varying structure and complexity. Many such queries however, are often structured to utilize query predicates which can not be evaluated until execution of the SQL query at runtime. A query predicate is generally known as an element of a search value that expresses or implies a comparison operation. In effect, a predicate specifies a condition about a row of data or group of data to be manipulated by an SQL query.

With SQL queries, a UNION operator and/or a UNION ALL operator specifies which data is to be retrieved from multiple independent sub-queries and presents a consistent set of columns and data-types to a parent operation of the SQL query. One usage of the UNION operator and/or the UNION ALL operator is to combine together a large data set that has been divided into multiple smaller tables for a number of reasons including: limitations in the amount of data that can be stored in a single table; enhancing performance through reduced lock contention, disk performance, index utility and others; combining results from statistical calculations; and others. The UNION operator and/or the UNION ALL operator may be used in the query to allow the parent operation to operate on a singular data object (i.e., a base table) even though data from multiple sub-queries and data objects may be retrieved.

Operators in a query language typically have one or more sources of input. When the UNION operator and/or the UNION ALL operator is present in a query, it is typically one of the inputs to at least one valid operator in the query language. We refer to each of those operators which receive input from the UNION operator and/or the UNION ALL operator as the parent operation. The specifics of the query language will determine what operators are valid as parent operators and what operation the parent operators will perform.

The nature of the UNION operator and/or the UNION ALL operator hides many properties of the underlying sub-queries from the parent operations including order, indexing, functional dependencies and column properties. Since these properties are unavailable to the parent operation, this lack of information may prevent the generation of an optimal access plan and may result in unnecessary work by the DBMS.

A known method of directing the DBMS to process the UNION operator and/or the UNION ALL operator contained in the SQL query is to process each of their sub-queries to produce their individual query results, and then combine those query results in a manner dictated by the UNION operator and/or the UNION ALL operator, and then flow the combined result to the parent operation. This approach may be problematic because of query optimization taking an extended period of time due to the many sub-queries of the UNION operator and/or UNION ALL operator and poor cache performance due to the size of the access plan.

Another known method of processing such operators is implemented outside of the DBMS by a controlling application in which the controlling application determines which data objects need to be operated thereon and instructing the DBMS on which data objects to access and in which manner. This approach requires a great deal of complexity in the controlling application which makes the controlling application more difficult to develop and maintain. It also defeats the purpose of the UNION operator and/or the UNION ALL operator, which hides the underlying structure from the controlling application, since the controlling application must now know the specification of the database design associated with the database.

Another known method to improve performance of queries against the UNION ALL operators is discussed a paper entitled "Partitioning in DB2 using UNION ALL View", February 2002, DB2 Developer Domain. However, this paper does not address the query optimization time or access plan size problems identified above.

There is a need for a data processing system, a data processing system implemented method and an article of manufacture for executing a query having a UNION operator.

SUMMARY

In a first aspect, the present invention provides a data processing system implemented method of directing a data processing system to execute a query against a database having data objects, the query having sub-queries and having a union operator, the union operator operable on sub-queries associated with the query, the database being operatively coupled to the data processing system, the data processing system implemented method including: grouping the sub-queries of the union operator according to identified structural similarities, the identified structural similarities being based on an analysis of the sub-queries, grouping the data objects of the database according to the grouped sub-queries, replacing the grouped data objects and any sub-queries associated with the grouped data objects with a reference to a representative data object and a representative sub-query, and accessing at least one member of the grouped data objects, the accessing of the at least one member of the grouped data object being based on the reference.

In a second aspect, the present invention provides a data processing system for executing a query against a database having data objects, the query having sub-queries and having a union operator, the union operator operable on sub-queries associated with the query, the database being operatively coupled to the data processing system, the data processing system including: a first grouping module for grouping the sub-queries of the union operator according to identified structural similarities, the identified structural similarities being based on an analysis of the sub-queries, a second grouping module for grouping the data objects of the database according to the grouped sub-queries, a replacing module for replacing the grouped data objects and any sub-queries associated with the grouped data objects with a reference to a representative data object and a representative sub-query, and an accessing module for accessing at least one member of the grouped data objects, the accessing of the at least one member of the grouped data object being based on the reference.

In a third aspect, the present invention provides an article of manufacture for directing a data processing system to execute a query against a database having data objects, the query having sub-queries and having a union operator, the union operator operable on sub-queries associated with the query, the database being operatively coupled to the data processing system, the article of manufacture including: a program usable medium embodying one or more instructions executable by the data processing system, the one or more instructions including: data processing system executable instructions for grouping the sub-queries of the union operator according to identified structural similarities, the identified structural similarities being based on an analysis of the sub-queries, data processing system executable instructions for grouping the data objects of the database according to the grouped sub-queries, data processing system executable instructions for replacing the grouped data objects and any sub-queries associated with the grouped data objects with a reference to a representative data object and a representative sub-query, and data processing system executable instructions for accessing at least one member of the grouped data objects, the accessing of the at least one member of the grouped data object being based on the reference.

BRIEF DESCRIPTION OF THE DRAWINGS

The foregoing and other aspects of the invention will become more apparent from the following description of the specific embodiments thereof and the accompanying drawings which illustrate, by way of example, only principles of the invention. In the drawings, where like elements feature like reference numerals (and wherein individual elements bear unique alphabetical suffixes).

DETAILED DESCRIPTION

Figure 1:
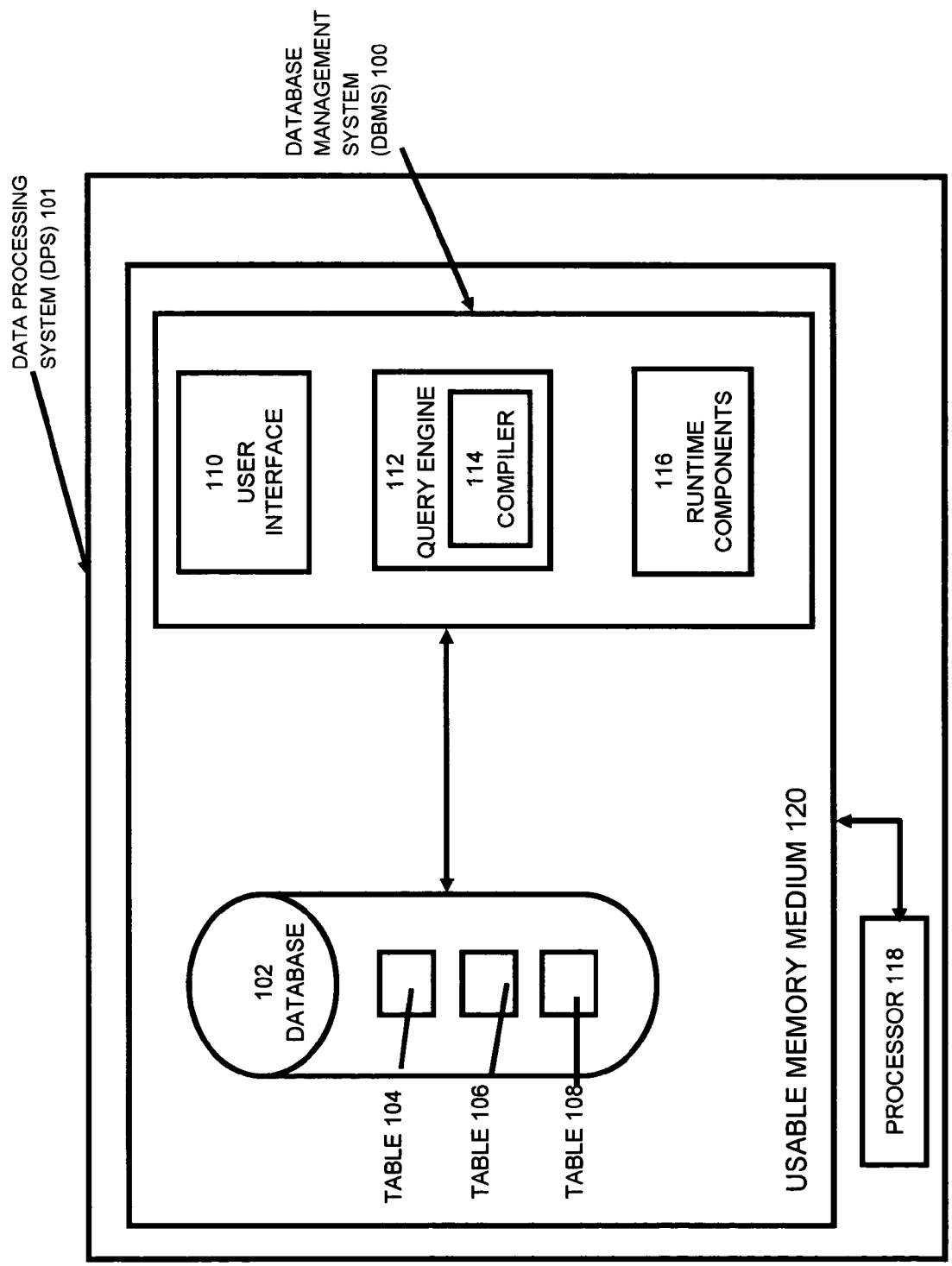
FIG. 1 shows a block diagram of a database management system (DBMS)

The description which follows, and the embodiments described therein, is provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The following detailed description of the embodiments of the present invention does not limit the implementation of the present invention to any particular data processing system programming language. The present invention may be implemented in any data processing system programming language provided that the OS (Operating System) provides the facilities that may support the requirements of the embodiments of the present invention. A preferred embodiment is implemented in the C or C++ computer programming language (or other computer programming languages in conjunction with C/C++). Any limitations presented may be quite likely a result of a particular type of OS, data processing system programming language, or data processing system and may not be a limitation of the embodiment of the present invention.

FIG. 1 shows a database management system (DBMS) 100. The DBMS 100 is implemented as data processing system executable code stored in usable memory medium which is operatively coupled to the a data processing system (DPS) 101. Operatively coupled to the DBMS 100 is a database 102 which is also stored in the usable memory 120 associated with the DPS 101. The DPS 101 also includes a processor 118 which is operatively coupled to the usable memory medium 120. The processor 118 executes the data processing system executable code associated with the DBMS 100 and thereby achieves desired operational performance of the DBMS 100.

The DBMS 100 includes a user interface 110 which provides an access point for a user of the DBMS 100 by which the user may enter database queries (for example, SQL or XQuery queries) against information stored in the database 102. The user interface 110 may further provide an interface for providing information requested in the query to a user of the DBMS 100.

The DBMS 100 may also include a query engine 112 and runtime components 116. The query engine 112 is for processing commands received through the user interface 110, typically in the form of SQL or XQuery statements. The query engine 112 may include a compiler 114. The compiler 114 may translate query statements from the user interface 110 into data processing system usable code so that the DPS 101 in which the DBMS 100 is implemented may act or operate upon the queries. Such DPS usable instructions or code may be generated as the runtime components 116 which may then be issued against the database 102.

The processor 118 may be used, among other things, for processing the runtime components 116 and other functions of the DBMS 100.

The query engine 112 may also be responsible for optimizing the queries and generating an access plan for each such query which are then used to access the database 102.

An information collection stored within the database 102 may be organized into tables such as a table 104, a table 106, and a table 108, so that the information may be organized in a logical manner, or to simply divide large amounts of data into smaller data objects. Information fields in the tables 104, 106 and 108 may be further organized by rows and columns. In general, data in the database 102 may be organized into data structures including rows that are indexable along one or more columns. Depending on an organization of a collection of data within database 102, it is possible for data to be duplicated within fields of different tables, such as the tables 104, 106 or 108.

When a SQL (or a XQuery) query is issued against the DBMS 100, the query engine 112 provides an optimization function whereby SQL queries are optimized for execution in the DBMS 100 based on information known to the query engine 112. However, many SQL queries are structured with predicates that utilize data variables with values that are not known until execution of the query at runtime.

The medium 120 may include hardware, software or a combination thereof such as, for example, magnetic disks, magnetic tape, optically readable medium, semi-conductor memory, or random access memory (RAM) and the like without restriction. Furthermore the DBMS may be organized in a standalone model whereby the DBMS may be operated by a single data processing system, or may be operated in a distributed manner over a plurality of network-coupled data processing systems. Also the DBMS may be operated under a client-server model whereby one or more data processing systems that act as servers which store the database, and one or more data processing systems that act as clients which operates the DBMS. The DBMS may be operated in any combination of the above-mentioned configurations.

Figure 2:
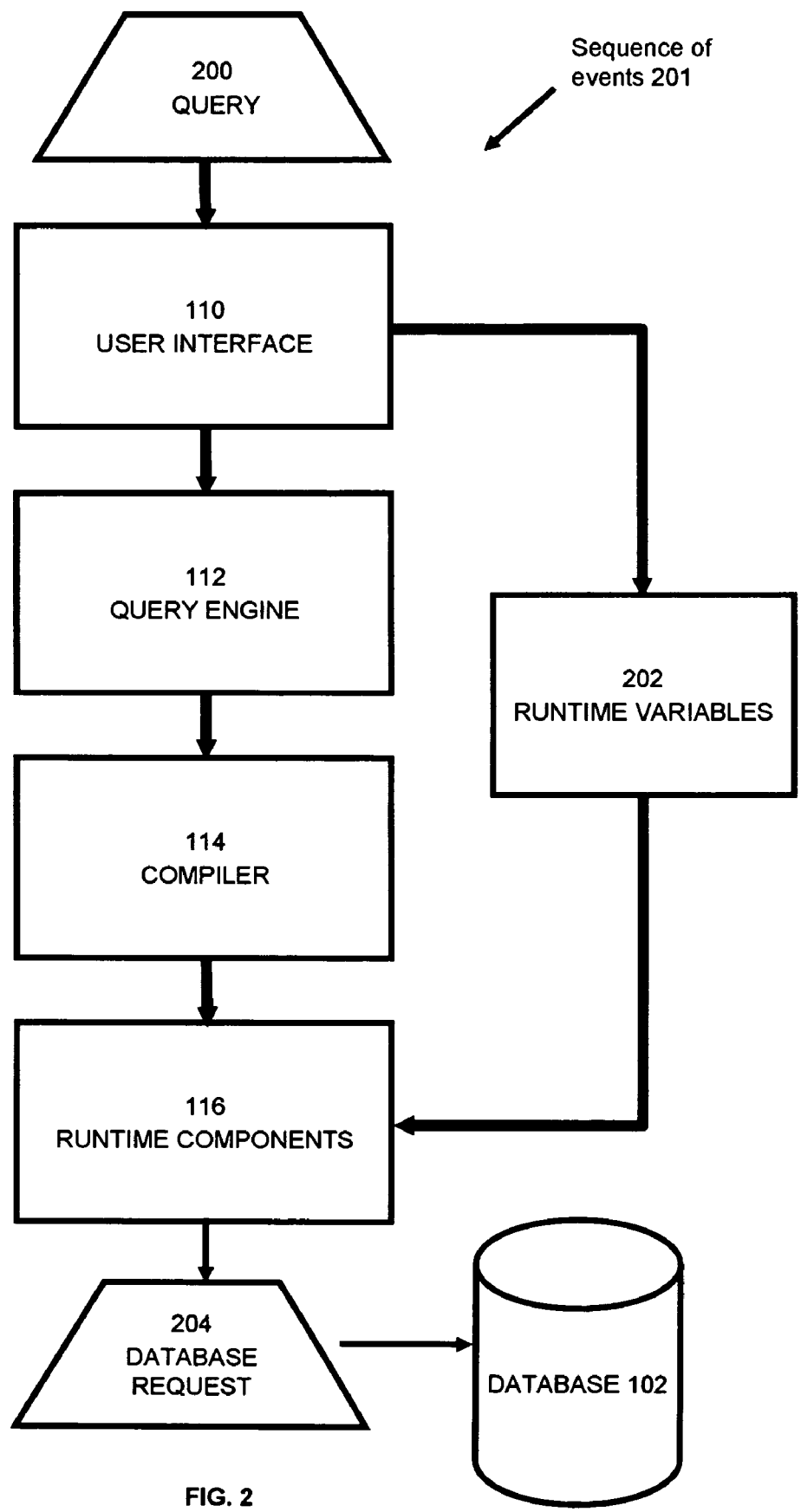
FIG. 2 shows a flow chart showing execution of an SQL query executed by the DBMS of FIG. 1.

FIG. 2 shows a sequence of events 201 following an issuance of a query 200 on the DBMS 100. After the query 200 is received by the user interface 110, the query 200 is passed to the query engine 112 for query optimization. The optimized query (not depicted) provides or generates an access plan (not depicted) that is then compiled by the compiler 114 to generate the runtime components 116. The runtime components 116 are readable by the processor 118. As the query 200 is being executed, i.e. at runtime, any data values for data variables and predicates required by the query 200 (such as, for example, the value of a host variable) would be retrieved by the processor 118 from runtime variables 202 and incorporated into the runtime components 116 by processor 118 to generate a database request 204. The database request 204 may then access the contents of the database 102 and execute the query 200 against the contents or information stored within the database 102.

The embodiment enhances query optimization of operations such as the UNION operator and/or the UNION ALL operator contained in the query 200. These operators allow data to be retrieved from multiple independent sub-queries or data objects, such as tables, and return a consistent set of data through the operation to a main, or parent query. For example, the UNION operator and/or the UNION ALL operator may be used in conjunction with a CREATE VIEW query operator to generate a view of different data objects, such as different tables, which are glued together to appear as a single, consistent data object that may then be manipulated by further query operators. For example, a query statement:

create view X as (select * from "table 104" UNION ALL select * from "table 106");

would create a logical view entitled "X" which includes all the data records from the tables 104 and 106. The logical view "X" may then itself be operated upon by SQL queries as if it were a data object of database 102. The UNION operator differs from the UNION ALL operator in that the UNION operator eliminates duplicate entries on the data which is returned from the operation, while the UNION ALL operator does not eliminate duplicates and returns all data entries.

The nature of the UNION operator and/or the UNION ALL operator is that many properties of the underlying sub-queries or data objects on which the UNION operator and/or the UNION ALL operator operates are hidden from the parent operator. For example, in the view "X" created above by the query statement:

create view X as (select * from "table 104" UNION ALL select * from "table 106");

If an SQL query is executed against the view "X", such as:

select * from X;

then in the above query, the view "X" appears as if it is a single data object to the SELECT operator, even though the data produced by the view "X" is generated by a number of sub-queries comprising SELECT operations on different data objects (in this case, tables 104 and 106).

Consider if, for example, the tables 104, 106 and 108 contain information about the stock of inventory available to a firm. In this example, each of the tables 104, 106, and 108 contains a data field referred to as warehouse_id, which identifies with an integer number a particular warehouse where a particular item of stock is located, and each table is restricted to contain a limited range of warehouse_id's.

Figure 3:
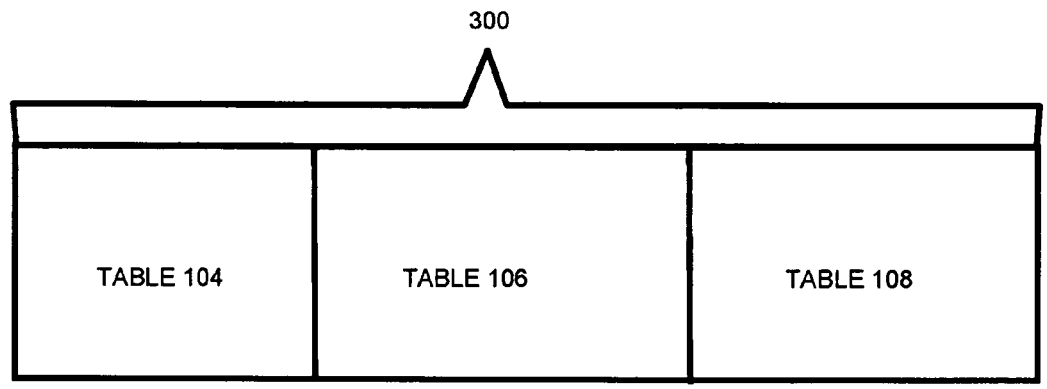
FIG. 3 shows a graphical representation of tables being combined by a UNION ALL operator by the DBMS of FIG. 1.

FIG. 3 shows an example graphical representation of a combination of tables 104, 106 and 108 along the warehouse_id dimension that may cover an entire range of warehouse_id's. Now, if the SQL operator CREATE VIEW is used to create a view entitled "stock":

create view STOCK as (select * from "table 104" UNION ALL select * from "table 106" UNION ALL select * from "table 108");

And then, if a parent query is executed against database 102 (such as):

select * from STOCK;

then a query optimizer (not depicted) associated with the query engine 112 could process the query by first having the UNION ALL operator access the underlying data objects contained in tables 104, 106 and 108 to first retrieve all the data in each of tables 104, 106, and 108, combine such data into a single, consistent data object, and then having the parent SELECT operator issued against the combined data from the underlying data objects.

Figure 3A:
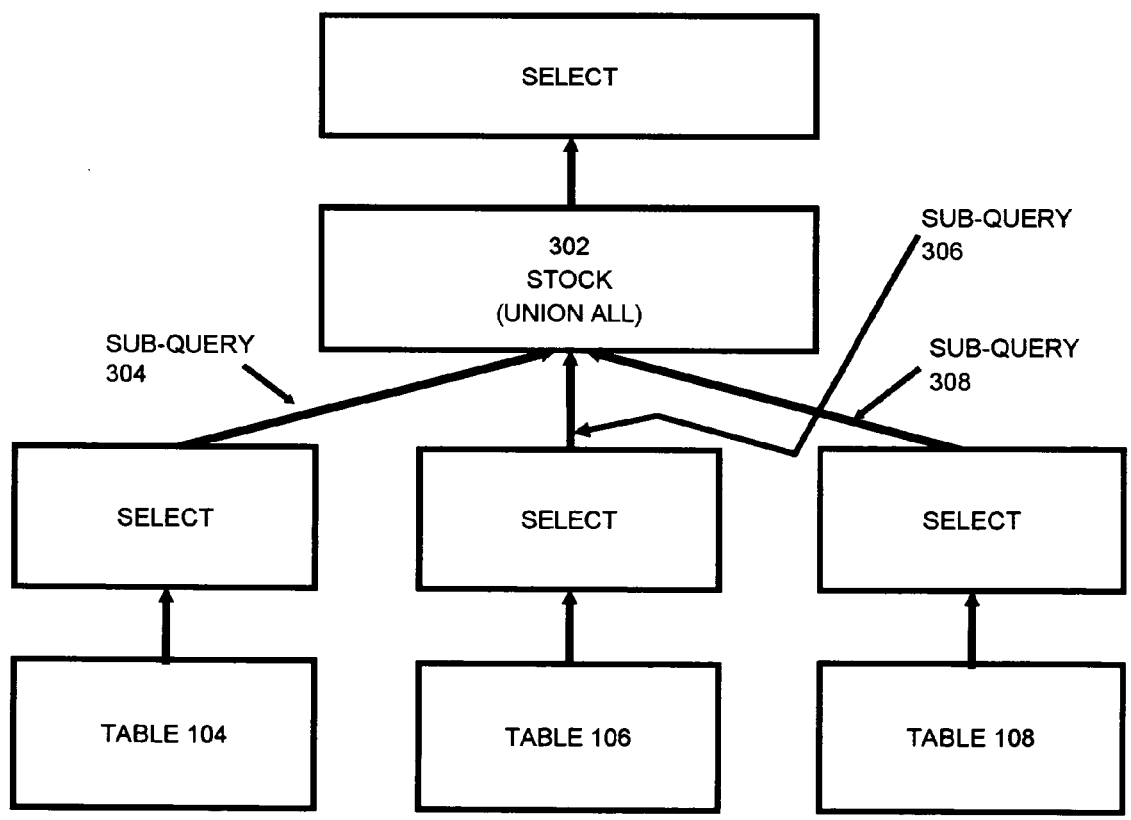
FIG. 3A shows a graphical representation of data flow of a select SQL query issued against the UNION ALL operator of FIG. 3.

In FIG. 3A, each operand of the UNION ALL operator, shown as a sub-query 304, a sub-query 306 and a sub-query 308, are referred to as sub-queries of the UNION ALL operator. Sub-queries of the UNION operator and/or the UNION ALL operator may contain any sequence of operations that are valid in the query language and may operate on any number of data objects.

Since properties of underlying data objects are hidden from the parent operation through the UNION operator and/or the UNION ALL operator, execution of the parent operation may not be fully optimized by the query optimizer in certain situations. For example, if the above query was limited to retrieving records for a specific warehouse as identified by an integer variable :int_var with the value 1 in the warehouse_id field, such as:

select * from STOCK where warehouse_id=:int_var;

then the query optimizer may request that data to be retrieved from tables 104, 106 and 108 by each sub-query 304, 306 and 308 respectively. The UNION ALL operator then combines the retrieved data and the parent operator filters it so that only data from row(s) identified by the variable :int_var in the column warehouse_id is returned. This may occur because the variable :int_var will not be instantiated until runtime of the query and therefore, at the time of optimization it cannot be determined that only data from a particular subset of the data objects referred to by the UNION ALL operator is required.

The embodiments described herein depend upon information maintained by DBMS 100 regarding the database 102 and the data objects stored within the database 102. This set of information, referred to as "database schema" and "database statistics", can be accessed from the catalog of the data processing system by the query engine 112 to perform query optimization. Database schema information may include restrictions on the data in each of data objects, columns and data types of those columns for the data objects in the database 102, indexes on data objects in the database. Database statistics may include information regarding access statistics for each table, size information, frequent value counts, distinct value counts and other performance tuning information. Other statistics may relate to attributes of tablespaces, tables, columns, indexes, views and others.

The query engine of DBMS 100 may include a routine for performing an analysis of the UNION operator and/or the UNION ALL operator along with its input sub-queries prior to runtime execution of the query. The result of the analysis allows the DBMS to determine which sub-queries of the UNION operator and/or the UNION ALL operator will provide relevant data to the query when execution actually occurs and enables the DBMS to avoid the execution of the irrelevant sub-queries. This routine is referred to as predetermination of sub-query relevance.

Pre-determination of sub-query relevance makes use of database schema and database statistics stored within a DBMS to "pre-determine", prior to runtime execution of queries, whether sub-queries of the UNION operator and/or the UNION ALL operator are relevant to the parent query. Pre-determination of sub-query relevance is divided into the following three broad steps:

The first step infers what data is available from each sub-query of the UNION operator and/or the UNION ALL operator through an evaluation of the constraints, functional dependencies and keys relating to the data objects referenced by each sub-query and the predicates and expressions of each sub-query. This is done by identifying relationships amongst the data restrictions on the columns between each sub-query. The inferring of what data is available is performed by assessing whether the sub-queries of the UNION operator and/or the UNION ALL operator are partitioned by a set of columns, that is, the step determines whether the data objects involved in the sub-queries of the UNION operator and/or the UNION ALL operator can be "partitioned" on the basis of one or more partitioning columns. The combination of the partitioning columns and the data restrictions gathered above is called a partitioning.

The above selection of partitioning columns can be illustrated by way of some simple examples.

Figure 5:
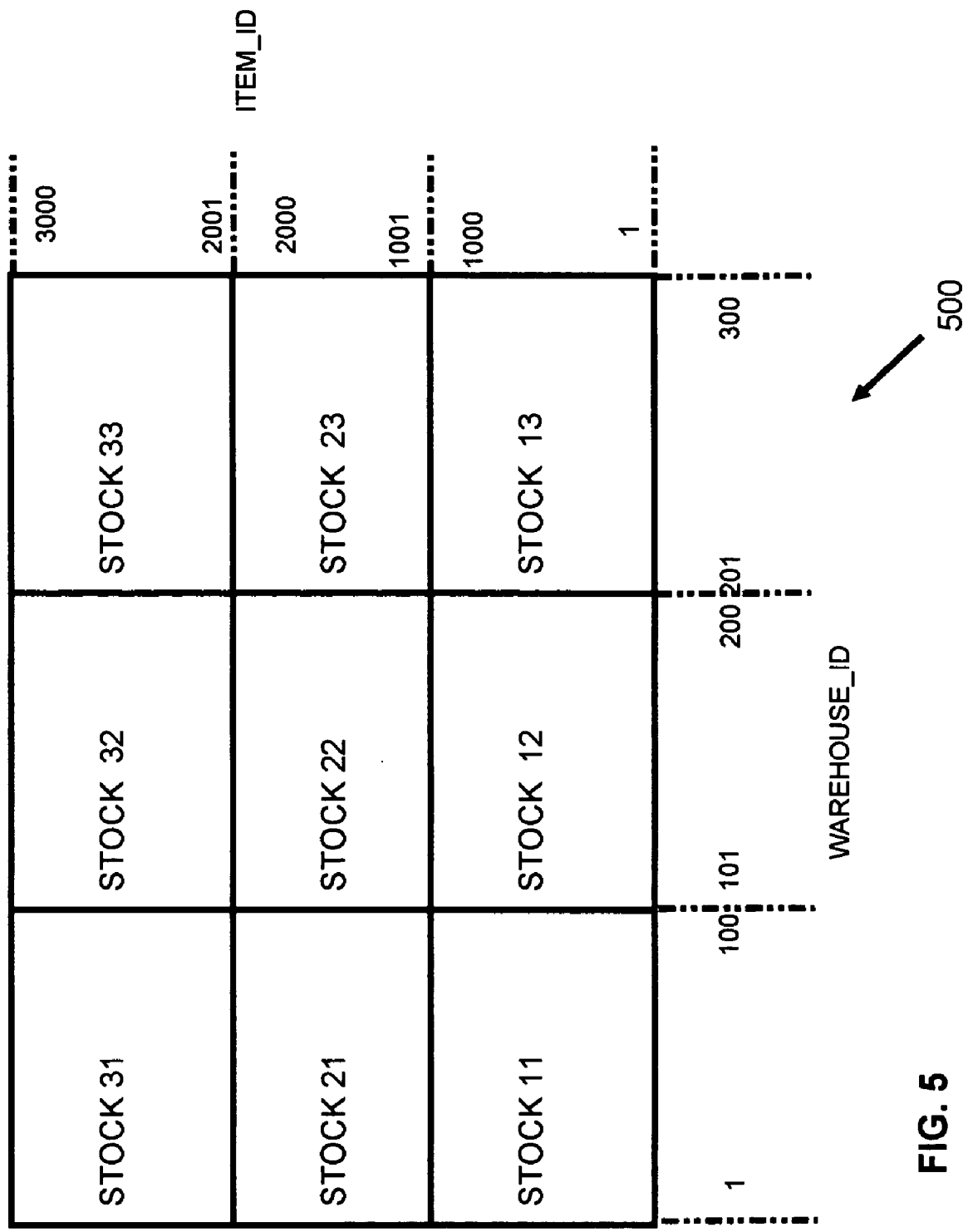
FIG. 5 shows a graphical representation of a relation between data objects in a database associated with the DBMS of FIG. 1.

FIG. 5 shows a graphical representation of a relation between data objects in a database associated with the DBMS 100 of FIG. 1. Referring to FIG. 5, consider the following simple two dimensional stock database created with the following sample SQL statements:

| | |
|---|---|
| create table STOCK11 | (warehouse_id integer item_id integer, num_in_stock integer, num_on_order integer); |
| create table STOCK 12 | (warehouse_id integer, item_id integer, num_in_stock integer, num_on_order integer); |
| create table STOCK13 | (warehouse_id integer, item_id integer, num_in_stock integer, num_on_order integer); |
| create table STOCK21 | (warehouse_id integer, item_id integer, num_in_stock integer, num_on_order integer); |
| create table STOCK22 | (warehouse_id integer, item_id integer, num_in_stock integer, num_on_order integer); |
| create table STOCK23 | (warehouse_id integer, item_id integer, num_in_stock integer, num_on_order integer); |
| create table STOCK31 | (warehouse_id integer, item_id integer, num_in_stock integer, num_on_order integer); |
| create table STOCK32 | (warehouse_id integer, item_id integer, num_in_stock integer, num_on_order integer); |
| create table STOCK33 | (warehouse_id integer, item_id integer, num_in_stock integer, num_on_order integer); | alter table STOCK11 add constraint
   wh_chk check (warehouse_id between 1 and 100);
alter table STOCK21 add constraint
   wh_chk check (warehouse_id between 1 and 100);
alter table STOCK31 add constraint
   wh_chk check (warehouse_id between 1 and 100);
alter table STOCK12 add constraint
   wh_chk check (warehouse_id between 101 and 200);
alter table STOCK22 add constraint
   wh_chk check (warehouse_id between 101 and 200);
alter table STOCK32 add constraint
   wh_chk check (warehouse_id between 101 and 200);
alter table STOCK13 add constraint
   wh_chk check (warehouse_id between 201 and 300);
alter table STOCK23 add constraint
   wh_chk check (warehouse_id between 201 and 300);
alter table STOCK33 add constraint
   wh_chk check (warehouse_id between 201 and 300);
alter table STOCK11 add constraint
   item_chk check (item_id between 1 and 1000);
alter table STOCK12 add constraint
   item_chk check (item_id between 1 and 1000);
alter table STOCK13 add constraint
   item_chk check (item_id between 1 and 1000);
alter table STOCK21 add constraint
   item_chk check (item_id between 1001 and 2000);
alter table STOCK22 add constraint
   item_chk check (item_id between 1001 and 2000);
alter table STOCK23 add constraint
   item_chk check (item_id between 1001 and 2000);
alter table STOCK31 add constraint item_chk check (item_id between 2001 and 3000);
alter table STOCK32 add constraint
  item_chk check (item_id between 2001 and 3000);
alter table STOCK33 add constraint
  item_chk check (item_id between 2001 and 3000);

From the above SQL query statements, a number of tables will be generated in the exemplary database with a graphical representation as shown on graph 500 in FIG. 5, whereby data range constraints for each table generated is shown along the horizontal and vertical axes of graph 500.

EXAMPLE 1

The case when the object STOCK is the UNION ALL operator of the base tables STOCK11, STOCK12, AND STOCK13. The SQL statement below shows how to define the object STOCK.
  create view STOCK as select * from STOCK11
    UNION ALL
    select * from STOCK12
    UNION ALL
    select * from STOCK13;

With reference to the first step of predetermination of sub-query relevance described above, it can be determined that warehouse_id is a partitioning column of the STOCK UNION ALL, because the data of tables STOCK11, STOCK12, and STOCK 13 is not overlapping along the dimension warehouse_id. Conversely, item_id is not a useful partitioning column of the STOCK UNION ALL because the each of the tables has the same range of valid values for that column and so would not aid the DBMS in preventing execution of sub-queries. The other columns of STOCK11, STOCK12 and STOCK13 are also not useful partitioning columns because they don't have any restrictions on the data in those columns.

EXAMPLE 2

The case when the object STOCK is the UNION ALL operator of the base tables STOCK11 and STOCK22. The SQL statement below shows how to define the object STOCK:
  create view STOCK as select * from STOCK 11
    UNION ALL
    select * from STOCK22;

Again with reference to the first step of predetermination of sub-query relevance, the embodiment determines that both warehouse_id and item_id are each independent partitioning columns. This is because either warehouse_id or item_id can determine the qualified sub-query of STOCK, that is, there is no overlap along either of those two dimensions.

EXAMPLE 3

The case when the object STOCK is a UNION ALL of the base tables STOCK11 to STOCK13, STOCK21 to STOCK23, and STOCK31 to STOCK33. The SQL statement below shows how to define the object STOCK:
  create view STOCK as
  select 1 as branch, warehouse_id, item_id, num_in_stock, num_on_order from STOCK11
    UNION ALL
  select 2 as branch, warehouse_id, item_id, num_in_stock, num_on_order from STOCK12
    UNION ALL
  select 3 as branch, warehouse_id, item_id, num_in_stock, num_on_order from STOCK13
    UNION ALL
  select 4 as branch, warehouse_id, item_id, num_in_stock, num_on_order from STOCK21
    UNION ALL
  select 5 as branch, warehouse_id, item_id, num_in_stock, num_on_order from STOCK22
    UNION ALL
  select 6 as branch, warehouse_id, item_id, num_in_stock, num_on_order from STOCK23
    UNION ALL
  select 7 as branch, warehouse_id, item_id, num_in_stock, num_on_order from STOCK31
    UNION ALL
  select 8 as branch, warehouse_id, item_id, num_in_stock, num_on_order from STOCK32
    UNION ALL
  select 9 as branch, warehouse_id, item_id, num_in_stock, num_on_order from STOCK33;

In this example, the view STOCK has a partitioning column on the combined columns warehouse_id and item_id, even though there is overlapping data sets along two dimensions. A partitioning column exists in warehouse_id and item_id because the combined columns are able to uniquely identify a two dimensional area which does not overlap with any other two dimensional area and thus implying that the two combined columns are capable of acting as a partitioning column to uniquely identify every row of data in every data object access by the sub-query. Both item_id and warehouse_id could be used on their own as partitioning columns since they could still be used to reduce the number of sub-queries that would be executed, however its usefulness is significantly less than the combination of the two columns. An independent partitioning column of the UNION ALL is the derived column "branch", the first expression of each sub-query.

The second step determines whether the parent query is only going to access a specific subset of the sub-queries making up the UNION operator and/or the UNION ALL operator. This involves an analysis of the parent operations of the UNION operator and/or the UNION ALL operator and the partitionings that were determined in the first step. A partitioning satisfies the requirements of a parent query only if the parent query has query predicates on every partitioning column of that partitioning. Extra predicates are acceptable, so long as the partitioning columns have predicates.

When examining predicates of the parent query, it is necessary that every partitioning column defined for the partitioning in question maps onto a query predicate. For example, with respect to the simple two dimensional stock database described above, if a view STOCK was created using the SQL statement of example 1 providing a UNION ALL of the table objects STOCK11, STOCK12 and STOCK13, then the following list of predicates in the parent query are representative of predicates that would make the partitioning column of warehouse_id useful (that is, having predicates that map onto each partitioning column):
  warehouse_id=:warehouse
  warehouse_id between :lowerid and :upperid
  warehouse_id in (:wh1, :wh2, :wh3, :wh4)
  warehouse_id=max(t1.warehouse_id) where t1.warehouse_id is the column
  warehouse_id from a joining table t1.
  warehouse_id=t2.warehouse_id where t2.warehouse_id is the column warehouse_id
  from a correlated table t2.

If it is determined that the partitioning satisfies the required condition of the parent query by having a parent query predicate map onto every partitioning column for the partitioning, then the partitioning is updated with any data restrictions of the parent query. Such data restrictions may be data ranges or set constraints of the predicate(s) of the parent query, as discussed above.

The third step relates to the runtime execution of the parent operations and the UNION operator and/or the UNION ALL operator. Upon invocation of the UNION operator and/or the UNION ALL operator by the parent operation, the variables that were not available during the first two steps have been instantiated. The UNION operator and/or the UNION ALL operator will then determine the sub-queries that will provide data to the query using these variables combined with the determined partitionings; and these relevant sub-queries may then be executed.

If a partitioning was stored with the UNION operator and/or the UNION ALL operator during the second step of pre-determination of sub-query relevance then the final step of executing the parent operator(s) and the UNION operator and/or the UNION ALL operator begins. When executing the UNION operator and/or the UNION ALL in conjunction with the partitioning, the UNION operator and/or the UNION ALL operator will use that partitioning information proved in prior steps to determine which sub-queries need to be executed. The determination of which sub-queries need to be executed is analogous to the execution of SQL CASE predicate except that multiple columns can be returned from each sub-query and more than one sub-query may be executed.

For example, consider the simple STOCK view from Example 1 above and the following SQL query:

select warehouse_id, sum(num_in_stock) as total_in_stock, sum(num_on_order) as total_on_order
    from STOCK
    where warehouse_id=:warehouse
    group by warehouse_id Recall that the view STOCK is generated from a UNION ALL statement, and that the warehouse_id column was identified as a partitioning column in the above example. If this UNION ALL has a partitioning, its runtime execution would be functionally equivalent to the following CASE expression representing the UNION ALL:

CASE WHEN :warehouse between 1 and 100 THEN
        <Execute Sub-query against STOCK1>
      WHEN :warehouse between 101 and 200 THEN
        <Execute Sub-query against STOCK2>
      WHEN :warehouse between 201 and 300 THEN
        <Execute Sub-query against STOCK3>
    END In the above example, the evaluation of the UNION operator and/or the UNION ALL using the partitioning does not require the generation of the logical data object STOCK by executing each sub-query of the UNION operator and/or the UNION ALL as would be necessary without pre-determination of sub-query relevance. Instead, the partitioning in conjunction with the variables from the parent operator predicates is evaluated at runtime to determine which sub-query or sub-queries of the UNION operator and/or the UNION ALL operator is to be executed to provide the results required by the parent query.

As such, it may be advantageous to have a query engine with further optimization capabilities in relation to the UNION operator and/or the UNION ALL operator.

In an embodiment, a system and method is provided for reducing the amount of computations that the query engine 112 has to perform in order to generate access plans in situations where sub-queries of a UNION operator and/or a UNION ALL operator can be identified as uniform. An access plan is generated by the query engine 112 prior to the execution of any query (or sub-query) in the DBMS 100. It is the control structure that is used to actually process the query or sub-query when it is executed at runtime. In the embodiment, if the sub-queries of a UNION operator and/or a UNION ALL operator are determined to be uniform (that is, having very similar characteristics), then such sub-queries are grouped together and a single parameterized sub-query is generated to replace the many sub-queries of that group. This in turn allows the query engine 112 to generate a single access plan for use with the parameterized sub-query of the group, instead of having to generate separate access plans for each sub-query of the group. This parameterization of uniform sub-queries reduces optimization time for large UNION operators and/or UNION ALL operators in query engine 112 because only the number of unique access plans is generated. This grouping of uniform sub-queries further reduces data copying cost within the DBMS 100 because the set of similar sub-queries is treated and executed as a single object so that copying of data across the UNION operator and/or the UNION ALL operator is avoided. Furthermore, parameterization of sub-queries reduces the total memory size used for storing access plans for the UNION operator and/or the UNION ALL operator, as only a single plan needs to be generated and stored for each parameterized sub-query associated with a group of uniform sub-queries. This reduction in memory size promotes package cache utilization by allowing a larger number of access plans to be stored in the cache concurrently, and may further provide an increase in available memory for other database objects.

In FIG. 3A, the query engine 112 begins parameterized access by first looking for uniformity between the sub-queries 304, 306 and 308, which include uniformity in the data objects being accessed by each sub-query, namely the tables 104, 106, and 108. If enough similarities are found between any two or more sub-queries such that they can be considered uniform, as explained below, then such sub-queries are grouped together so that the query engine 112 can generate a parameterized sub-query that instantiates one or more particular sub-queries during execution at runtime. With a parameterized sub-query, the query engine 112 only generates a single optimized parameterized access plan that is appropriate for use with each sub-query which has been replaced by a single parameterized sub-query.

Figure 4:
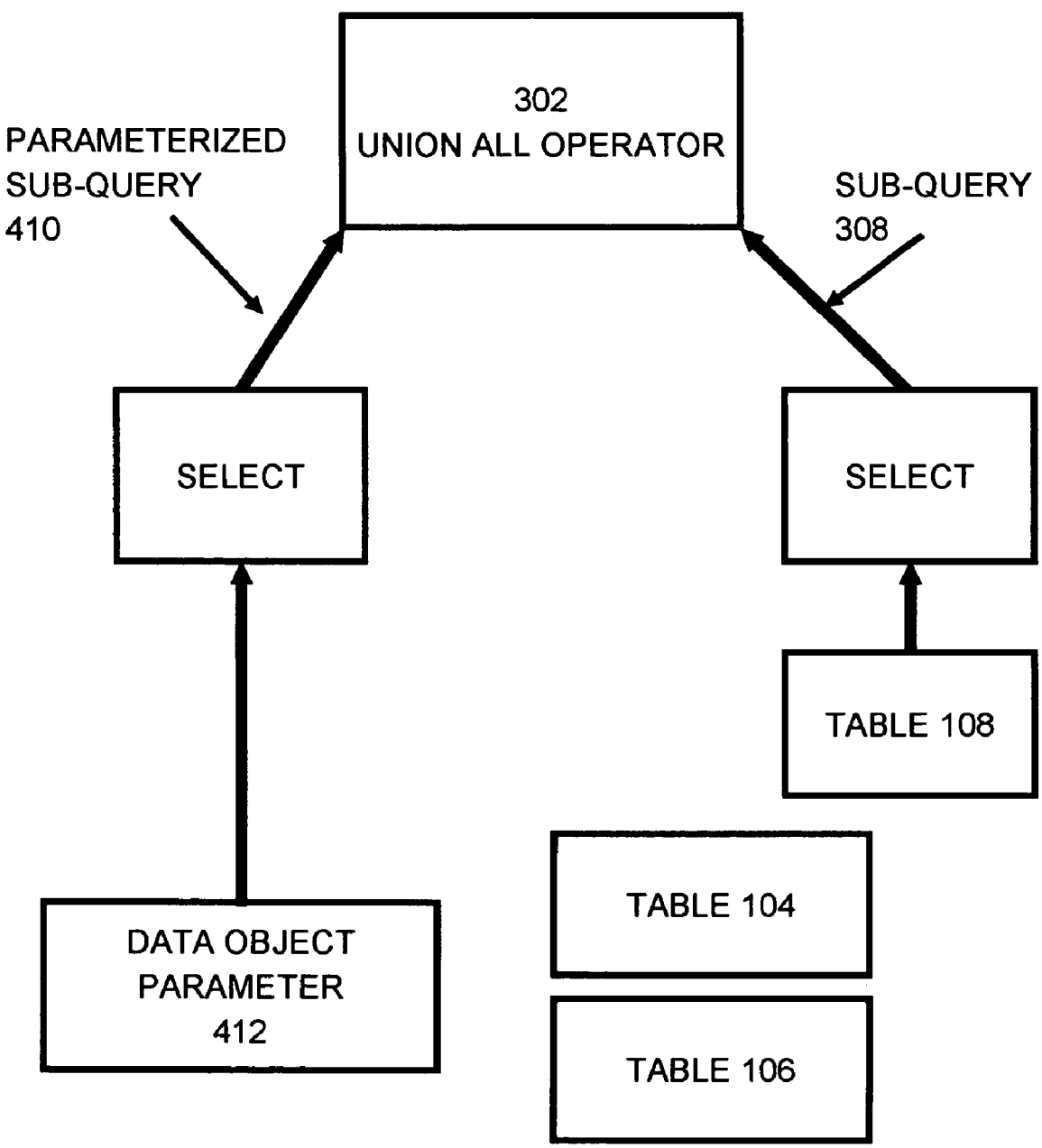
FIG. 4 shows a graphical representation of the sub-queries of FIG. 3A being grouped into a parameterized sub-query.

FIG. 4 shows a graphical representation of the sub-queries of FIG. 3A being grouped into a parameterized sub-query. For example, if the sub-queries 304 and 306 are considered uniform with respect to each other, and the sub-query 308 is not considered uniform with respect to the sub-queries 304 and 306 then the sub-queries 304 and 306 will be grouped together and a parameterized sub-query 410 generated to replace the sub-queries 304 and 306 with a data object parameter 412 associated with tables 104 and 106, as shown in FIG. 4. Since sub-queries that are considered to be uniform are replaced with parameterized sub-query 410, query engine 112 can now optimize only a single sub-query (i.e. the parameterized sub-query 410), as opposed to the multiple sub-queries 304 and 306, and only generate a single access plan for parameterized sub-query 410. When parameters determining which of sub-queries 304 and 306 are relevant to the query results, the data object parameter 412 of parameterized sub-query 410 is instantiated to become functionally equivalent to sub-queries 304 or 306 or both, as the case may be. Since table 108 is not considered uniform with respect to any other sub-query of the UNION operator and/or the UNION ALL operator 302, sub-query 308 is not grouped with any other sub-query, and consequently a separate, unique access plan would need to be generated by query engine 112 for sub-query 308.

In determining the uniformity of sub-queries of a UNION operator and/or a UNION ALL operator and grouping uniform sub-queries into single group, the structure of the sub-queries, including the data objects accessed by the sub-queries, is analyzed and compared. In addition the statistics of the data objects being accessed by each sub-query may be analyzed and compared. Statistics for data objects, relating to performance, size and data distribution among others, are generally maintained by a DBMS. Further detail on the use of statistics is provided below. The purpose of determining the uniformity of sub-queries in order to identify a group is two-fold: (i) to determine that the sub-queries structure and table structure of the underlying data objects are exactly the same so that a single parameterized sub-query can replace the various sub-queries; and (ii) to ensure that the statistics for each sub-query and underlying data objects are at least "close enough" such that the access plan that is generated for the group can be optimized in such way that provides reasonable performance across all sub-queries that are grouped together. It will be appreciated that with respect to structure, sub-queries can be grouped together only if their structure is identical, while with respect to statistics, what constitutes "close enough" depends on a performance trade-off for generating fewer access plans in exchange for having a generic access plan that may not be fully optimized for all sub-queries within a group. The structures that must be identical among different sub-queries include: sub-query structure; definition of underlying data objects, including indexes, columns, and data types of each column; expressions and predicates of each sub-query; and distribution of tables to multiple nodes if the DBMS in question is a distributed DBMS.

To determine statistical uniformity, statistics of data objects of each sub-query are compared, including, for example, the physical memory size of each data object being accessed; the number of pages in the table and the number of overflow pages for the table; and the estimated physical size of a table. Indexes can also be examined to determine uniformity, including examining indexes for information such as number of leaf pages, number of sequential pages, density, the number of levels, the clustering factor, the key cardinalities and others for the index. While there is complete freedom for the criteria to be set for determining statistical uniformity, including the option to simply not check for statistical uniformity, in the embodiment, checks are performed to ensure that at least some level of uniformity in statistics of sub-queries that are grouped together. To determine statistical uniformity, formulas may be used to determine whether sub-queries are uniform with each other, such as for example, the formula shown below which can be used to determine whether a particular statistic of the data objects being accessed is uniform:

$$\sum \left| \frac{x}{\sum x} - \frac{1}{n} \right| 100 \le \ln(n-1)^2$$

where "x" represents the set of values from each data object for the statistic to be checked, and "n" is the number of sub-queries in the group.

After uniform sub-queries have been grouped together, a parameterized sub-query may then be generated to replace the separate individual sub-queries of the group. Since all sub-queries that are grouped together are structurally identical, the generation of a parameterized sub-query may be performed by taking any one of the sub-queries in the group and inserting a parameter for each table or index object referred to in the sub-query.

After a parameterized sub-query has been generated for a uniform group of sub-queries and data objects, a partitioning for the parameterized sub-query may be derived from the partitioning of the UNION operator and/or the UNION ALL operator if the UNION operator and/or the UNION ALL operator has a partitioning. A partitioning allows the runtime execution of a UNION operator and/or a UNION ALL operator to determine which sub-queries need to be executed and to only execute those sub-queries.

When executing a parameterized sub-query, the parameters may then be evaluated at runtime to have the required sub-queries executed. If a partitioning for the parameterized sub-query exists that partitioning can be evaluated to limit which sub-queries actually need to be executed.

For example, referring to FIGS. 3A and 4, if sub-queries 304 and 306 are determined to be uniform, and sub-queries 304 and 306 each provides as follows:
Sub-Query 304:
select * from TABLE 104;
Sub-Query 306:
select * from TABLE 106;

Then parameterized sub-query 410 may be represented as follows:
select * from CHOOSE_TABLE([Parameterization Condition], "TABLE 104", "TABLE 106");

where the parameter [Parameterization Condition] is a predicate that determines which sub-queries need to be executed. The aforementioned partitioning is an example of a Parameterization Condition. Furthermore if there is no parameterization condition, all sub-queries must be executed.

Figure 6:
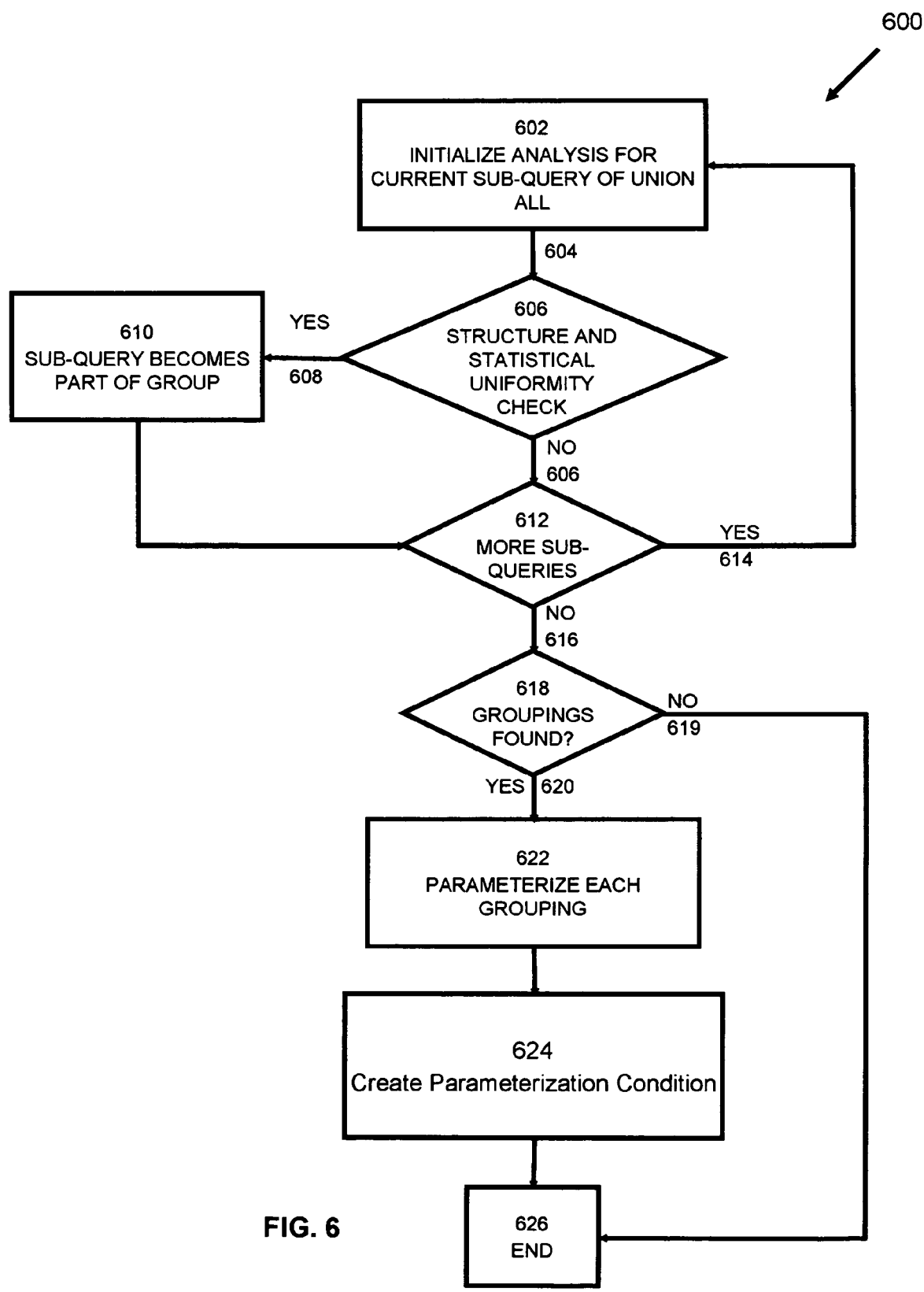
FIG. 6 shows a flow chart illustrating a routine for determining sub-query uniformity and operating a parameterized sub-query in the DBMS of FIG. 1.

FIG. 6 shows a flow chart illustrating a routine for determining sub-query uniformity and operating a parameterized sub-query in the DBMS 100 of FIG. 1. In the embodiment, the implementation of parameterized access of uniform objects may be done by a routine associated with the query engine 112, the operation of which is shown graphically in FIG. 6. The operations depicted in FIG. 6 represents steps of a routine for determining uniformity of sub-queries and generating any parameterized sub-queries that may be appropriate. While the description below describes a single routine, it will be appreciated that implementation of parameterized access of uniform objects may be by way of one or a plurality of routines over any number of hardware and software combinations.

Beginning at step 602, each sub-query of the UNION operator and/or the UNION ALL operator can be analyzed iteratively in turn by proceeding down path 604 for each sub-query.

In step 606, the sub-query currently being analyzed is checked for structural and statistical uniformity with any previously analyzed sub-query, as described above. If the current sub-query is found to be uniform with at least one previously analyzed sub-query, then path 608 is taken to step 610 where a grouping of sub-queries is updated to include the just analyzed sub-query. Thereafter, the routine proceeds to step 612 to examine if there are further sub-queries to be analyzed.

If at step 606 the currently analyzed sub-query is not found to be uniform with any previously examined sub-query, then path 606 is taken to 612 to evaluate if there are further sub-queries to be analyzed.

From step 612, if it is determined that there are additional sub-queries to be analyzed, the path 614 is taken to return to 602 to initiate the analysis of a further sub-query of the UNION operator and/or the UNION ALL operator. If at step 612 it is determined that there are no further sub-queries to be analyzed, then path 616 is taken to step 618 to determine if there were any grouping of uniform sub-queries that was found in steps 606 and 610. If not, then path 619 is taken to end the parameterization of uniform objects routine as it has been determined that there are no similar sub-queries of the UNION operator and/or the UNION ALL operator which can be grouped together so that a parameterized sub-query can be created for such group of sub-queries.

However, if groupings were determined to have been found at step 618, then path 620 is taken to step 622 where a parameterized sub-query is generated for each grouping of sub-queries that was found, as explained above. Following step 622 the routine proceeds to step 624 where a partitioning for the parameterized sub-query is generated from the partitioning of the UNION operator and/or the UNION ALL operator if the UNION operator and/or the UNION ALL operator has a partitioning. Following step 624, the algorithm ends at step 626.

After parameterized sub-queries are generated, access plans are generated for the query, including access plans for each parameterized sub-query and sub-queries which were not grouped, as is known in the art. The access plans for the parameterized sub-queries can be used to execute different sub-queries grouped together in association with the parameterized sub-query at runtime, as explained above.

Although the invention has been described with reference to certain specific embodiments, various modifications thereof will be apparent to those skilled in the art without departing from the spirit and scope of the invention as outlined in the claims appended hereto.

The invention claimed is:

1. A data processing system implemented method of directing a data processing system to execute a query against a database having data objects, the query having sub-queries being subject of a union operator, the database being operatively coupled to the data processing system, the method comprising:
   analyzing a sub-query of the union operator for structural uniformity and statistical uniformity with any previously analyzed sub-query;
   generating groupings of the sub-queries being structurally and statistically uniform;
   generating a parameterized sub-query for each of the groupings, the parameterized sub-query being one of the sub-queries of the grouping and including a parameter for each table or index object of the sub-query; and
   generating access plans for each parameterized sub-query and for the sub-queries not being part of any of the groupings,
   wherein the structural uniformity indicates that the structure of the sub-queries are identical,
   wherein the structure of a sub-query includes expression of each sub-query, predicates of each sub-query, distribution of tables to multiple nodes and definition of underlying data objects including indexes, columns and data types of each column,
   wherein the statistical uniformity indicates that the statistics of data objects of the sub-queries are similar based on a pre-determined performance criteria, and
   wherein the statistics of a data object includes performance, size and data distribution of the data object.

2. A data processing system for executing a query against a database having data objects, the query having sub-queries operated upon by a union operator, the database being operatively coupled to the data processing system, the data processing system comprising:
   a processor;
   a usable memory medium;
   an analyzer module for analyzing a sub-query of the union operator for structural uniformity and statistical uniformity with any previously analyzed sub-query;
   a groupings module for generating groupings of the sub-queries being structurally and statistically uniform;
   a generator module for generating a parameterized sub-query for each of the groupings, the parameterized sub-query being one of the sub-queries of the grouping and including a parameter for each table or index object of the sub-query; and
   an access module for generating access plans for each parameterized sub-query and for the sub-queries not being part of any of the groupings,
   wherein the structural uniformity indicates that the structure of the sub-queries are identical,
   wherein the structure of a sub-query includes expression of each sub-query, predicates of each sub-query, distribution of tables to multiple nodes and definition of underlying data objects including indexes, columns and data types of each column,
   wherein the statistical uniformity indicates that the statistics of data objects of the sub-queries are similar based on a pre-determined performance criteria, and
   wherein the statistics of a data object includes performance, size and data distribution of the data object.

3. An article of manufacture for directing a data processing system to execute a query against a database having data objects, the query having sub-queries and having a union operator, the union operator operable on sub-queries associated with the query, the database being operatively coupled to the data processing system, the article of manufacture comprising:
   a processor;
   a usable memory medium for storing one or more instructions executable by the data processing system, the one or more instructions comprising:
   analyzing a sub-query for structural uniformity and statistical uniformity with any previously analyzed sub-query;
   generating groupings of the sub-queries being structurally and statistically uniform;
   generating a parameterized sub-query for each of the groupings, the parameterized sub-query being one of the sub-queries of the grouping and including a parameter for each table or index object of the sub-query; and
   generating access plans for each parameterized sub-query and for the sub-queries not being part of any of the groupings,
   wherein the structural uniformity indicates that the structure of the sub-queries are identical,
   wherein the structure of a sub-query of the union operator includes expression of each sub-query, predicates of each sub-query, distribution of tables to multiple nodes and definition of underlying data objects including indexes, columns and data types of each column,
   wherein the statistical uniformity indicates that the statistics of data objects of the sub-queries are similar based on a pre-determined performance criteria, and
   wherein the statistics of a data object includes performance, size and data distribution of the data object.

* * * * *